(12) United States Patent
Lee et al.

(10) Patent No.: US 11,308,953 B2
(45) Date of Patent: Apr. 19, 2022

(54) SPEECH RECOGNITION METHOD AND ELECTRONIC DEVICE FOR SUPPORTING THE SAME

(71) Applicant: Samsung Electronics Co., Ltd., Suwon-si (KR)

(72) Inventors: Miran Lee, Suwon-si (KR); Sunkyoung Kim, Suwon-si (KR); Hyerin Kim, Suwon-si (KR); Seongick Jon, Suwon-si (KR); Hankyung Jeon, Suwon-si (KR); Edward Arthur Schweizer, San Jose, CA (US); Gaurav Bhushan, Palo Alto, CA (US); Marco Paolo Antonio Iacono, San Francisco, CA (US); Mark Brian Mozolewski, Los Gatos, CA (US); Richard James Schatzberger, Los Angeles, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 200 days.

(21) Appl. No.: 16/535,819

(22) Filed: Aug. 8, 2019

(65) Prior Publication Data
US 2020/0051562 A1 Feb. 13, 2020

(30) Foreign Application Priority Data
Aug. 8, 2018 (KR) ........................ 10-2018-0092700

(51) Int. Cl.
*G10L 15/22* (2006.01)
*G10L 15/07* (2013.01)

(52) U.S. Cl.
CPC .............. *G10L 15/22* (2013.01); *G10L 15/07* (2013.01); *G10L 2015/223* (2013.01); *G10L 2015/225* (2013.01)

(58) Field of Classification Search
USPC ...................................................... 704/1–504
See application file for complete search history.

(56) References Cited

U.S. PATENT DOCUMENTS

| 8,086,275 B2 | 12/2011 | Wykes et al. |
| 8,250,494 B2 | 8/2012 | Butcher et al. |

(Continued)

FOREIGN PATENT DOCUMENTS

| JP | 2014-225796 A | 12/2014 |
| KR | 10-2009-0115599 A | 11/2009 |

(Continued)

OTHER PUBLICATIONS

International Search Report dated Nov. 29, 2019, issued International Patent Application No. PCT/KR2019/010017.

(Continued)

*Primary Examiner* — Marcus T Riley
(74) *Attorney, Agent, or Firm* — Jefferson IP Law, LLP

(57) ABSTRACT

An electronic device is provided. The electronic device includes a display, a microphone, a memory, a communication circuitry, and a processor. The processor receives a voice input of a user via the microphone, displays a first response corresponding to the voice input on the display, receives a first user input, displays a user interface for changing at least one parameter associated with the voice input, in response to the first user input, receives a second user input via the user interface, and displays a second response corresponding to the voice input on the display based on a value of the at least one parameter, the value being selected by the second user input.

20 Claims, 10 Drawing Sheets

(56) References Cited

U.S. PATENT DOCUMENTS

| | | | |
|---|---|---|---|
| 8,634,876 B2 | 1/2014 | Friedman et al. | |
| 8,650,210 B1* | 2/2014 | Cheng | G06F 16/951 |
| | | | 707/770 |
| 8,781,533 B2 | 7/2014 | Wykes et al. | |
| 8,825,699 B2 | 9/2014 | Kruzeniski et al. | |
| 8,970,499 B2 | 3/2015 | Wykes et al. | |
| 9,141,705 B2 | 9/2015 | Lai | |
| 9,172,789 B2 | 10/2015 | Kruzeniski et al. | |
| 9,218,067 B2 | 12/2015 | Kruzeniski et al. | |
| 9,223,411 B2 | 12/2015 | Butcher et al. | |
| 9,223,412 B2 | 12/2015 | Friedman et al. | |
| 9,275,641 B1 | 3/2016 | Gelfenbeyn et al. | |
| 9,430,794 B2 | 8/2016 | Isaacson et al. | |
| 9,460,209 B1 | 10/2016 | Cheng et al. | |
| 9,606,704 B2 | 3/2017 | Wykes et al. | |
| 9,703,452 B2 | 7/2017 | Kruzeniski et al. | |
| 9,721,566 B2* | 8/2017 | Newendorp | G10L 15/32 |
| 9,858,925 B2* | 1/2018 | Gruber | G10L 15/18 |
| 9,917,904 B1 | 3/2018 | Cheng et al. | |
| 10,083,688 B2* | 9/2018 | Piernot | G10L 15/22 |
| 10,133,453 B2 | 11/2018 | Wykes et al. | |
| 10,255,907 B2* | 4/2019 | Nallasamy | G10L 15/16 |
| 10,270,862 B1 | 4/2019 | Cheng et al. | |
| 10,311,871 B2* | 6/2019 | Newendorp | G06F 3/167 |
| 10,650,621 B1* | 5/2020 | King | H04L 67/10 |
| 10,748,153 B2* | 8/2020 | Van Os | H04M 1/72403 |
| 10,803,862 B2* | 10/2020 | Jang | G06F 3/0484 |
| 2010/0105370 A1 | 4/2010 | Kruzeniski et al. | |
| 2010/0105438 A1 | 4/2010 | Wykes et al. | |
| 2010/0105439 A1 | 4/2010 | Friedman et al. | |
| 2010/0105440 A1 | 4/2010 | Kruzeniski et al. | |
| 2010/0107068 A1 | 4/2010 | Butcher et al. | |
| 2010/0107100 A1 | 4/2010 | Schneekloth et al. | |
| 2010/0180233 A1 | 7/2010 | Kruzeniski et al. | |
| 2010/0318551 A1 | 12/2010 | Lai | |
| 2012/0028687 A1 | 2/2012 | Wykes et al. | |
| 2012/0212495 A1 | 8/2012 | Butcher et al. | |
| 2012/0265528 A1 | 10/2012 | Gruber et al. | |
| 2014/0094226 A1 | 4/2014 | Friedman et al. | |
| 2014/0297284 A1 | 10/2014 | Gruber et al. | |
| 2014/0320415 A1 | 10/2014 | Wykes et al. | |
| 2015/0026157 A1 | 1/2015 | Kruzeniski et al. | |
| 2015/0169079 A1 | 6/2015 | Wykes et al. | |
| 2015/0277681 A1* | 10/2015 | Isaacson | G06F 3/0484 |
| | | | 705/26.8 |
| 2015/0346912 A1* | 12/2015 | Yang | G06F 3/0485 |
| | | | 715/727 |
| 2015/0378532 A1 | 12/2015 | Kruzeniski et al. | |
| 2016/0078866 A1 | 3/2016 | Gelfenbeyn et al. | |
| 2016/0260431 A1* | 9/2016 | Newendorp | G10L 15/32 |
| 2016/0351190 A1* | 12/2016 | Piernot | G10L 15/22 |
| 2016/0358600 A1* | 12/2016 | Nallasamy | G10L 15/16 |
| 2017/0116987 A1* | 4/2017 | Kang | G06F 3/03 |
| 2017/0185582 A1 | 6/2017 | Gelfenbeyn et al. | |
| 2017/0186209 A1 | 6/2017 | Butcher et al. | |
| 2017/0300191 A1 | 10/2017 | Wykes et al. | |
| 2017/0336926 A1* | 11/2017 | Chaudhri | H04L 51/18 |
| 2018/0033431 A1* | 2/2018 | Newendorp | G06F 3/167 |
| 2018/0308480 A1* | 10/2018 | Jang | G06F 3/167 |
| 2020/0051562 A1* | 2/2020 | Lee | G10L 15/22 |
| 2020/0273268 A1* | 8/2020 | Bhattacharyya | |
| | | | H04L 12/40169 |

FOREIGN PATENT DOCUMENTS

| | | |
|---|---|---|
| KR | 10-2013-0068303 A | 6/2013 |
| KR | 10-2013-0080713 A | 7/2013 |
| WO | 2014/197635 A2 | 12/2014 |

OTHER PUBLICATIONS

Extended European Search Report dated Jan. 7, 2020, issued European Patent Application No. 19190726.0-1221.
European Office Action dated Jun. 23, 2021, issued in European Application No. 19190726.0.

* cited by examiner

SPEECH RECOGNITION METHOD AND ELECTRONIC DEVICE FOR SUPPORTING THE SAME

CROSS-REFERENCE TO RELATED APPLICATION(S)

This application is based on and claims priority under 35 U.S.C. § 119(a) of a Korean patent application number 10-2018-0092700, filed on Aug. 8, 2018, in the Korean Intellectual Property Office, the disclosure of which is incorporated by reference herein its entirety.

BACKGROUND

1. Field

The disclosure relates to technologies about a method for recognizing voices of users and an electronic device for supporting the method.

2. Description of Related Art

Various electronic devices which operate in response to an interactive voice input (or an utterance input or a voice command input) of a user have been released to the market. For example, a smartphone may perform various functions, for example, making/taking a call, message transmission and reception, file transfer, and web search, in response to a voice input of the user.

The electronic device may analyze a voice input of the user through an internal arithmetic operation or processing using an external server. The electronic device may display the result of analyzing the voice input and may provide various services the user wants.

The above information is presented as background information only to assist with an understanding of the disclosure. No determination has been made, and no assertion is made, as to whether any of the above might be applicable as prior art with regard to the disclosure.

SUMMARY

When providing a service corresponding to a voice input of a user, an electronic device according to an existing technology may provide the service in a manner which simply displays a result or a manner which allows the user to continuously select one of various options. In the manner which simply displays the result, when the user wants to change an option, he or she should generate a voice input again. In the manner which allows the user to one of the various options, the user should generate an additional input for determining an option continuously with respect to a one-time voice input.

Aspects of the disclosure are to address at least the above-mentioned problems and/or disadvantages and to provide at least the advantages described below. Accordingly, an aspect of the disclosure is to provide an apparatus and method for recognizing voices of users and an electronic device for supporting the method.

Additional aspects will be set forth in part in the description which follows and, in part, will be apparent from the description, or may be learned by practice of the presented embodiments.

In accordance with an aspect of the disclosure, an electronic device is provided. An electronic device includes a display, a microphone, a memory, a communication circuitry, and a processor. The processor may be configured to receive a voice input of a user via the microphone, display, on the display, a first response corresponding to the voice input, receive a first user input, display, on the display, a user interface for changing at least one parameter associated with the voice input, in response to the first user input, receive a second user input via the user interface, and display a second response corresponding to the voice input on the display based on a value of the at least one parameter, the value being selected by the second user input.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
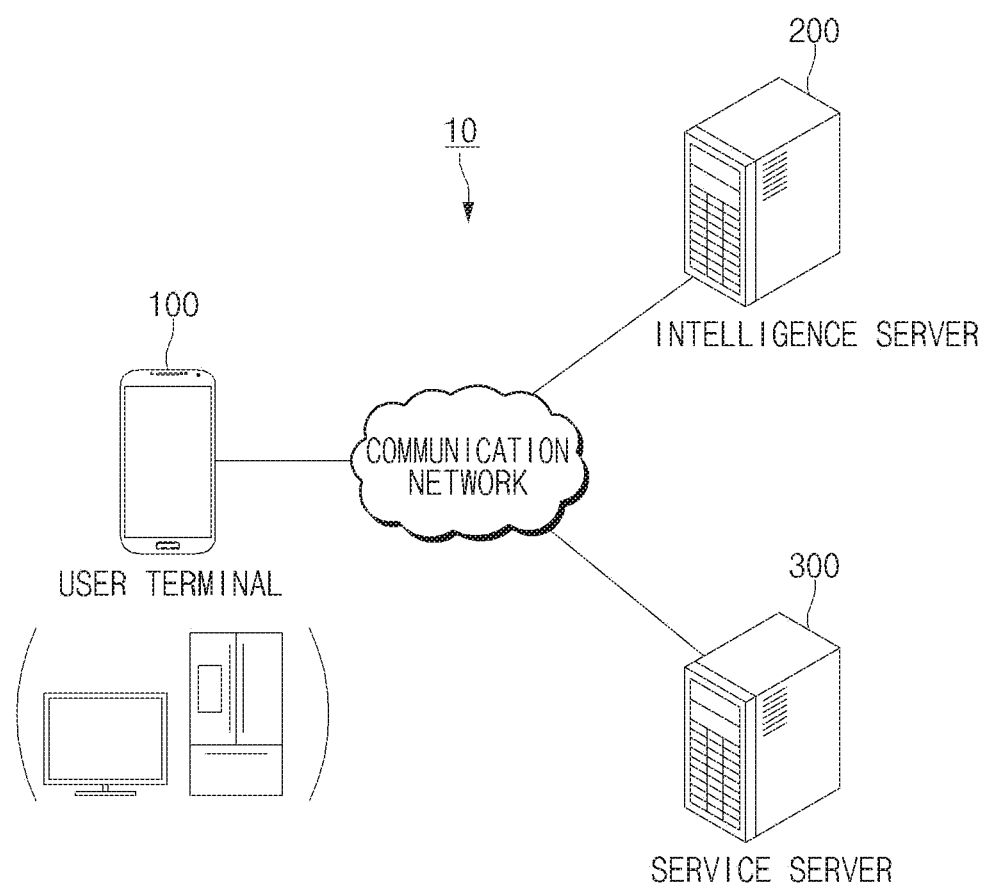
FIG. 1 is a drawing illustrating an integrated intelligent system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of various embodiments described herein can be made without departing from the scope and spirit of the disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. CPU, for example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. In some cases, even if terms are terms which are defined in the specification, they may not be interpreted to exclude embodiments of the disclosure.

According to various embodiments of the disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the disclosure will be described with reference to the accompanying drawings. The term "user" used herein may refer to a person who uses an electronic device or may refer to a device (for example, an artificial electronic device) that uses an electronic device.

FIG. 1 is a drawing illustrating an integrated intelligent system according to an embodiment of the disclosure.

Referring to FIG. 1, an integrated intelligent system 10 may include a user terminal 100, an intelligence server 200, and a service server 300.

According to an embodiment, the user terminal 100 may provide a specified service to its user through an app (or an application program) (e.g., an alarm app, a message app, a schedule app, or the like) stored therein. According to an embodiment, the user terminal 100 may provide a speech recognition service through an intelligence app (or a speech recognition app) stored therein. For example, the user terminal 100 may recognize a voice input received through the intelligence app and may provide a service corresponding to the recognized voice input to the user. According to an embodiment, the user terminal 100 may correspond to each of various terminals devices (or various electronic devices) connectable to the Internet, for example, a mobile phone, a smartphone, a personal digital assistant (PDA), or a notebook computer. Alternatively, the user terminal 100 may be a device such as a television (TV), a refrigerator, a speaker, or the like, each of which includes a display.

According to an embodiment, the user terminal 100 may receive a user input. The user input may include, for example, an input through a physical button, a touch input, a voice input, or the like. According to an embodiment, the user terminal 100 may receive a voice input by a user utterance. The user terminal 100 may perform a specified operation based on the received voice input. For example, the user terminal 100 may execute an app corresponding to the received voice input and may perform the specified operation by means of the executed app.

According to an embodiment, the intelligence server 200 may receive a voice input from the user terminal 100 over a communication network. According to an embodiment, the intelligence server 200 may change the received voice input to text data. According to an embodiment, the intelligence server 200 may generate a plan for performing a specified task based on the text data. The plan may include, for example, a plurality of operations arranged on a stage-by-stage basis (or on a hierarchical basis) to perform a task corresponding to an intent of the user. A plurality of concepts may be to define an input value (or a parameter) associated with the plurality of operations and a format of a result value.

According to an embodiment, the plan may be generated by an artificial intelligence (AI) system. The AI system may be a rule-based system or may a neural network-based system (e.g., a feedforward neural network (FNN) or a recurrent neural network (RNN)). Alternatively, the AI system may be a combination of the above-mentioned systems or an AI system different from the above-mentioned systems. According to an embodiment, the plan may be selected from a set of pre-defined plans or may be generated in real time in response to a user request. For example, the AI system may at least select a plan among a plurality of pre-defined plans or may generate a plan on a dynamic basis (or on a real-time basis). Furthermore, the user terminal 100 may use a hybrid system for providing a plan.

According to an embodiment, the intelligence server 200 may transmit a result according to the generated plan to the user terminal 100 or may transmit the generated plan to the user terminal 100. According to an embodiment, the user terminal 100 may display a result according to the plan on its display. According to an embodiment, the user terminal 100 may display the result of executing an operation according to the plan on the display.

According to an embodiment, the service server 300 may provide a specified service (e.g., food order, hotel reservation, or the like) to the user terminal 100. According to an embodiment, the service server 300 may be a server operated by a third party. The third party may be a person except for a manufacturer of the user terminal 100 and a person who operates the intelligence server 200. According to an embodiment, the service server 300 may provide information about the specified service to the intelligence server 200. According to an embodiment, the intelligence server 200 may determine an operation for performing a task corresponding to a voice input based on the provided information. According to an embodiment, the service server 300 may provide information about the result of performing the determined operation to the intelligence server 200. The intelligence server 200 may transmit the result information to the user terminal 100.

Thus, the integrated intelligent system 10 may identify an intent of a user utterance by means of the intelligence server 200 and may determine an operation thereof to depart from a level of processing an input through a physical button, a touch panel, or the like or a voice input for executing a simple operation (e.g., activation of an electronic device or execution of a program) and to provide a new type of input interface, capable of processing a user utterance which requires a plurality of operations which are organically related to each other, to the user.

According to various embodiments, the service server 300 may provide an execution result associated with an application which is not installed in the user terminal 100 to the intelligence server 200. The intelligence server 200 may provide a service associated with an application which is not installed in the user terminal 100 to the user terminal 100 in response to a voice input of the user.

Figure 2:
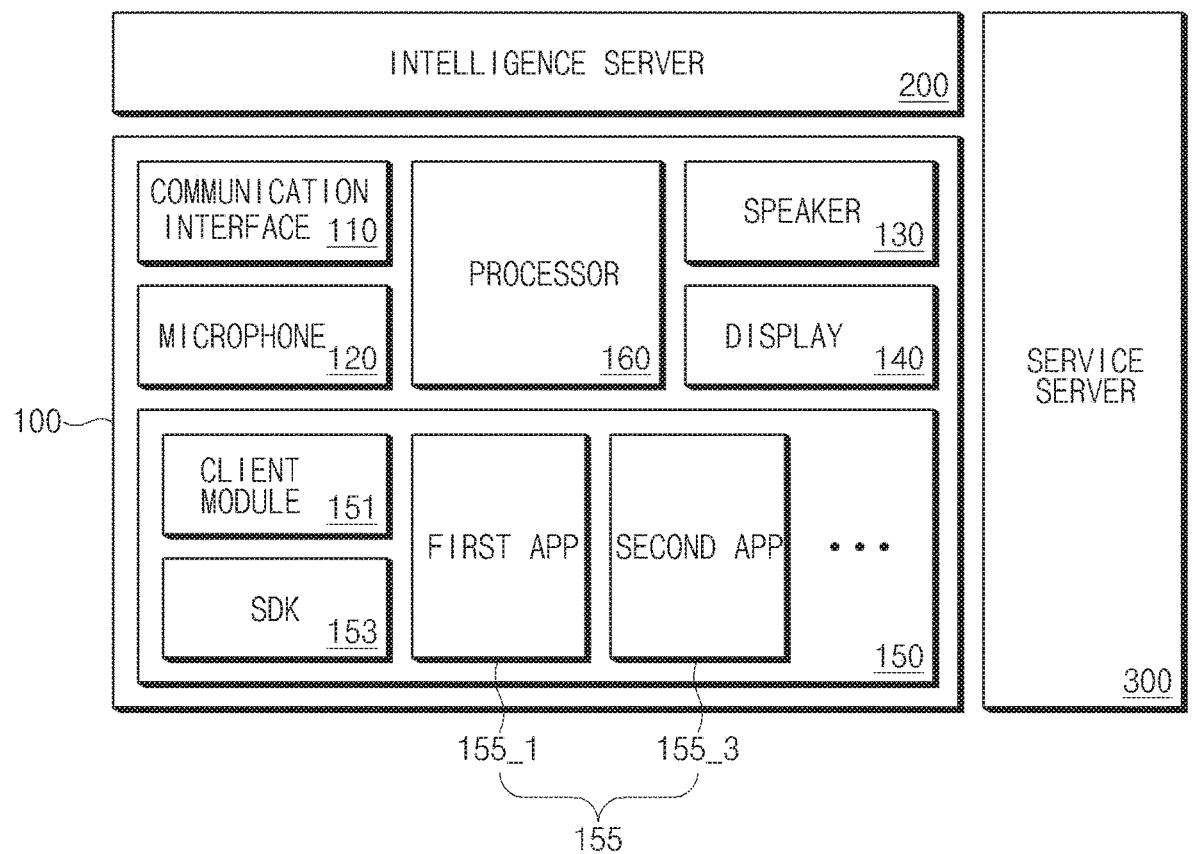
FIG. 2 is a block diagram illustrating a configuration of a user terminal according to an embodiment of the disclosure.

FIG. 2 is a block diagram illustrating a configuration of a user terminal according to an embodiment of the disclosure.

Referring to FIG. 2, a user terminal 100 may include a communication interface 110, a microphone 120, a speaker 130, a display 140, a memory 150, and a processor 160.

According to an embodiment, the communication interface 110 may be connected to an external device to transmit and receive data. For example, the communication interface 110 may transmit the received voice input to an intelligence server 200. Furthermore, the communication interface 110 may receive a response corresponding to the voice input. The response may include, for example, information for performing a task corresponding to the voice input or a result of performing the task.

According to an embodiment, the microphone 120 may receive a voice input by a user utterance. For example, the microphone 120 may detect a user utterance and may generate a signal (or a voice signal) corresponding to the detected user utterance.

According to an embodiment, the speaker 130 may output a voice signal. For example, the speaker 130 may output a voice signal generated in the user terminal 100 to the outside.

According to an embodiment, the display 140 may display an image (or a video image). For example, the display 140 may display a graphic user interface (GUI) of an executed app.

According to an embodiment, the memory 150 may store a client module 151 and a software development kit (SDK) 153. Each of the client module 151 and the SDK 153 may be a framework (or a solution program) for performing a universal function. For example, each of the client module 151 and the SDK 153 may be a framework for processing a voice input. According to an embodiment, each of the client module 151 and the SDK 153 may be executed by the processor 160, and a function thereof may be implemented. According to an embodiment, the client module 151 and the SDK 153 may be implemented in hardware as well as software.

According to an embodiment, the memory 150 may store a plurality of apps (or application programs) 155. The plurality of apps 155 may be programs for performing a specified function. According to an embodiment, the plurality of apps 155 may include a first app 155_1, a second app 155_3, and the like. According to an embodiment, each of the plurality of apps 155 may include a plurality of operations for performing the specified function. According to an embodiment, the plurality of apps 155 may be executed by the processor 160 to sequentially execute at least some of the plurality of operations. The processor 160 may control operations of the plurality of apps 155 through the SDK 153.

According to an embodiment, the processor 160 may control an overall operation of the user terminal 100. For example, the processor 160 may control the communication interface 110 to be connected with an external device. The processor 160 may be connected with the microphone 120 to receive a voice input. The processor 160 may be connected with the speaker 130 to output a voice signal. The processor 160 may be connected with the display 140 to output an image. The processor 160 may execute a program stored in the memory 150 to perform a specified function.

According to an embodiment, the processor 160 may execute at least one of the client module 151 and the SDK 153 to perform an operation below for processing a voice input. An operation below, described as an operation of the client module 151 and the SDK 153, may be an operation by execution of the processor 160.

According to an embodiment, the client module 151 may receive a voice input. For example, the client module 151 may receive a voice signal corresponding to a user utterance detected by the microphone 120. According to an embodiment, the client module 151 may preprocess the received user input. According to an embodiment, to preprocess the user input, the client module 151 may include an adaptive echo canceller (AEC) module, a noise suppression (NS)

module, an end-point detection (EPD) module, or an automatic gain control (AGC) module. The AEC module may cancel an echo included in the user input. The NS module may suppress background noise included in the user input. The EPD module may detect an end point of a user voice included in the user input and may find a portion where there is a voice of the user using the detected end point. The AGC module may adjust volume of the user input to be suitable for recognizing the user input and processing the recognized user input. According to an embodiment, all the preprocessing components may be executed for performance, but some of the preprocessing components may be executed to operate with a low power.

According to an embodiment, the client module 151 may transmit the received voice input to the intelligence server 200. For example, the client module 151 may transmit first data corresponding to the received voice input to the intelligence server 200 through the communication interface 110. According to an embodiment, the client module 151 may transmit state information of the user terminal 100 together with the received voice input to the intelligence server 200. The state information may be, for example, information about a state where an app is executed. According to an embodiment, the client module 151 may obtain information about a state where an app is executed, through the SDK 153.

According to an embodiment, the client module 151 may receive text data corresponding to the transmitted voice input. According to an embodiment, the client module 151 may display the received text data on the display 140. The client module 151 may display the received text data on the display 140 in a streaming manner. Thus, the user may identify a voice input received in the user terminal 100.

According to an embodiment, the client module 151 may receive a result corresponding to the received voice input. For example, when it is able for the intelligence server 200 to calculate a result corresponding to the received voice input (in case of a server end point), the client module 151 may receive a result corresponding to the received voice input. The result may include, for example, information corresponding to the received voice input. Furthermore, the result may additionally include information about a specified state of a specified app (e.g., the first app 155_1) for displaying the information. According to an embodiment, the client module 151 may display the received result on the display 140.

According to an embodiment, the client module 151 may receive a request for obtaining information necessary to calculate a result corresponding to a voice input from the intelligence server 200. According to an embodiment, the client module 151 may transmit the necessary information to the intelligence server 200 in response to the request. Thus, the client module 151 may receive a result calculated using the information.

According to an embodiment, the client module 151 may receive a plan corresponding to the received voice input. For example, when it is unable for the intelligence server 200 to obtain a result corresponding to the received user input (in case of a client end point), the client module 151 may receive a plan corresponding to the received voice input. The plan may include, for example, a plurality of operations for performing a task corresponding to a voice input and a plurality of concepts associated with the plurality of operations. The concept may be to define a parameter input in execution of the plurality of operations or a result value output by the execution of the plurality of operations. Furthermore, the plan may include information about an arrangement relationship between the plurality of operations and between the plurality of concepts. The plurality of operations and the plurality of concepts may be arranged on a stage-by-stage basis (or on a sequential basis) to perform a task corresponding to a voice input. According to an embodiment, the client module 151 may deliver the received plan to the SDK 153.

According to an embodiment, the client module 151 may use a deep link when receiving information necessary for an operation from the intelligence server 200. For example, the client module 151 may receive operation information for obtaining necessary information and a deep link including a plan corresponding to a voice input from the intelligence server 200. The plan may include a plurality of pieces of operation information for performing a task.

According to an embodiment, the SDK 153 may execute at least one (e.g., the first app 155_1 and the second app 155_2) of the plurality of apps 155 depending on a plan and may execute a specified operation of the at least one executed app. For example, the SDK 153 may bind at least one app to be executed according to a plan and may deliver a command according to the plan to the bound app to execute a specified operation. When a result value generated through an operation of one app (e.g., the first app 155_1) is a parameter to be (or necessary to be) input in execution of an operation of another app (or the second app 155_2), the SDK 153 may deliver the generated result value from the one app to the other app.

According to an embodiment, the client module 151 may display a result of executing a plurality of operations of an app depending on a plan on the display 140. The client module 151 may sequentially display the results of executing the plurality of operations on the display 140. For another example, the user terminal 100 may display only some of executing the plurality of operations (e.g., only a result of a last operation) on the display 140. For another example, the user terminal 100 may receive a result of performing an operation according to a plan from the intelligence server 200 and may display the received result on the display 140.

According to another embodiment, the SDK 153 may be included in each of the plurality of apps 155. In other words, each of the plurality of apps 155 may include the SDK 153. When each of the plurality of apps 155 includes the SDK 153, the client module 151 may execute an app depending on a plan and may transmit a request for executing a specified operation through the SDK 153 included in each of the plurality of apps 155.

According to an embodiment, the client module 151 may transmit information about a result of executing the plurality of operations depending on a plan to the intelligence server 200. The intelligence server 200 may determine that the received voice input is correctly processed, using the result information.

According to an embodiment, the client module 151 may receive a request for obtaining additional information from the intelligence server 200. The additional information may be information necessary to determine a plan corresponding to the received voice input. For example, the additional information may include any one of state information of the user terminal 100 or content information stored in the memory 150 of the user terminal 100. According to an embodiment, the client module 151 may obtain information about a state where an app is executed, through the SDK 153. According to an embodiment, when information necessary to determine a plan is not included in the received voice input, the intelligence server 200 may transmit the request for obtaining the additional information to the user terminal 100.

According to an embodiment, the client module 151 may include a voice input module. According to an embodiment, the client module 151 may recognize a voice input for performing a limited function through the voice input module. For example, the client module 151 may perform an intelligence app for processing a voice input for performing an organic operation through a specified input (e.g. wake up!). According to an embodiment, the voice input module may assist the intelligence server 200 to process a voice input. Thus, the voice input module may quickly process a voice input capable of being processed in the user terminal 100.

According to an embodiment, a speed recognition module of the client module 151 may recognize a voice input using a specified algorithm. The specified algorithm may include at least one of, for example, a hidden Markov model (HMM) algorithm, an artificial neural network (ANN) algorithm or a dynamic time warping (DTW) algorithm.

Figure 3:
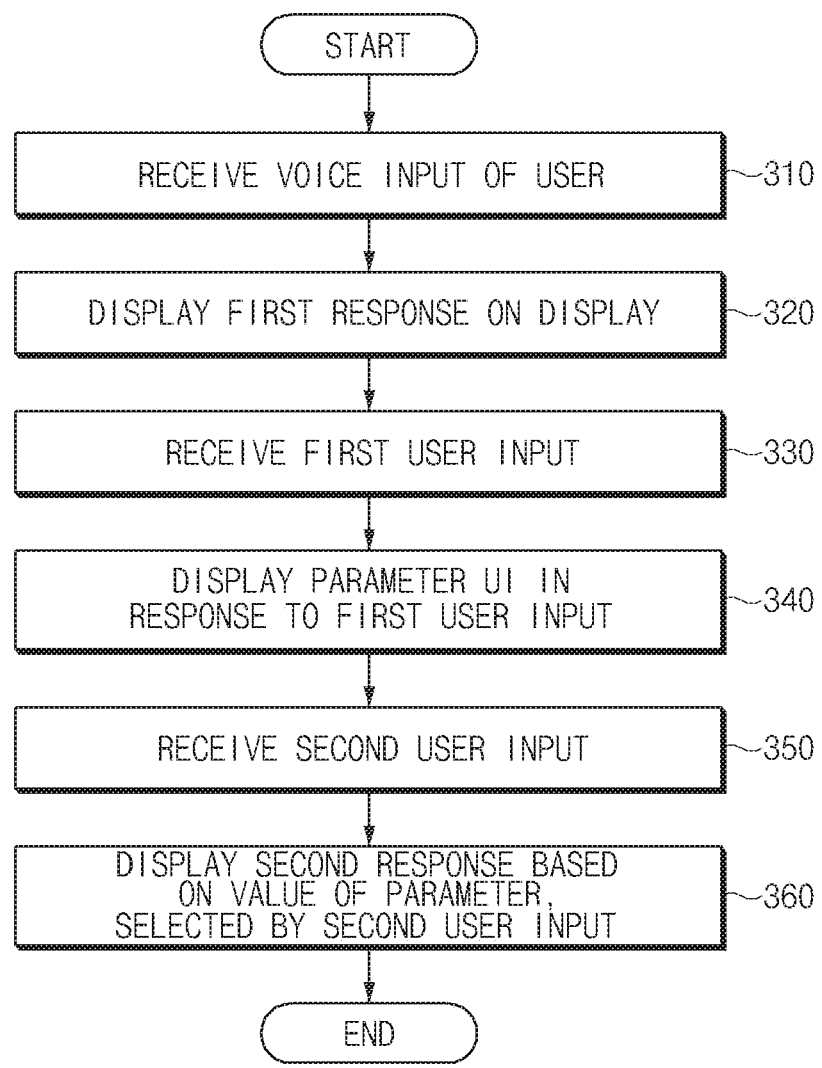
FIG. 3 is a flowchart illustrating a method for processing a voice input according to an embodiment of the disclosure.

FIG. 3 is a flowchart illustrating a method for processing a voice input according to an embodiment of the disclosure.

Referring to FIG. 3, in operation 310, a processor 160 of FIG. 2 may receive a voice input (or an utterance input or a voice command) of a user via a microphone 120 of FIG. 2. According to an embodiment, the processor 160 may execute an intelligence app to wait for receiving a voice input of the user. The intelligence app may be executed by an input of the user or may be executed by calling of another application.

According to an embodiment, the processor 160 may convert an electrical signal generated by the microphone 120 into a text and may display the converted text on a display 140 of FIG. 2 in real time.

According to an embodiment, the processor 160 may provide a voice input (or information into which the voice input is converted (e.g., a text in which a voice is converted)) to an intelligence server 200 of FIG. 2.

The voice input may be an interactive command the user tells. For example, the voice input may be the utterance "find a hotel in San Jose under $400 for Thanksgiving weekend", "send these photos to mom", or the like.

According to various embodiments, the voice input may include at least one parameter necessary for a user terminal 100 of FIG. 2 to perform a service (or a response or a task) corresponding to the voice input. In the voice input "find a hotel in San Jose under $400 for Thanksgiving weekend", the processor 160 may determine 'Thanksgiving weekend', 'San Jose', 'under $400', 'hotel', or the like as a parameter. For another example, in the voice input "send these photos to mom", the processor 160 may determine 'these photos (e.g., photos selected on a screen)', 'mom', or the like as a parameter.

Each parameter may have specified attributes (e.g., location attributes, date attributes, time attributes, application type attributes, or the like) and may change to a specified type (e.g., 'Thanksgiving weekend'→'2018/11/18').

According to various embodiments, the processor 160 of the user terminal 100 or the intelligence server 200 may determine a parameter (hereinafter referred to as "hidden parameter") which is not included in a voice input of the user. The hidden parameter may be essential to perform a service (or a response or a task) corresponding to a voice input of the user and may be determined according to a specified rule which is not included in the voice input of the user.

For example, in the voice input "find a hotel in San Jose for Thanksgiving weekend (on the hotel search app)", the processor 160 or the intelligence server 200 may determine 'on the hotel search app', which is not included a voice input of the user, as a hidden parameter. For another example, in the voice input "send these photos to mom (through the message app)", the processor 160 or the intelligence server 200 may determine 'message app', which is not included in a voice input of the user, as a hidden parameter.

The hidden parameter may be determined based on a state where the user terminal 100 is used, app execution information of the user terminal 100, a history where the user executes an app, or the like.

According to various embodiments, the processor 160 of the user terminal 100 or the intelligence server 200 may determine a parameter (hereinafter referred to as "option parameter") changeable in a specified range among parameters about a voice input of the user. The option parameter may be a parameter changeable in the specified range among parameters or hidden parameters, which are included in a voice input of the user.

For example, in the voice input "find a hotel in San Jose for Thanksgiving weekend", the processor 160 of the user terminal 100 or the intelligence server 200 may determine 'Thanksgiving weekend' having period attributes as an option parameter. When the same two place names are found for 'San Jose' having location attributes, the processor 160 of the user terminal 100 or the intelligence server 200 may determine 'San Jose' as an option parameter.

In operation 320, the processor 160 may display a first response corresponding to the voice input on the display 140. For example, in response to the voice input "find a hotel in San Jose under $400 for Thanksgiving weekend", the processor 160 may display a result of searching for a list of hotels under $400, capable of being reserved near San Jose for Thanksgiving weekend, using the 'Hotels.com' application.

According to an embodiment, the processor 160 may display the first response without requesting a separate additional input although a hidden parameter is included in a voice input of the user.

According to an embodiment, the processor 160 may analyze and process a voice input using the intelligence server 200. The processor 160 may transmit a voice input (or information associated with the voice input) to the intelligence server 200. The intelligence server 200 may receive a voice input from the user terminal 100 over a communication network. According to an embodiment, the intelligence server 200 may change the received voice input to text data. According to an embodiment, the intelligence server 200 may generate a plan to perform a specified task based on the text data.

The intelligence server 200 may transmit a result according to the generated plan to the user terminal 100. The user terminal 100 may display the result according to the plan as the first response on the display 140. The intelligence server 200 may execute the plan using a service server 300 of FIG. 2.

According to another embodiment, the intelligence server 200 may transmit the generated plan to the user terminal 100. The user terminal 100 may execute an operation according to the received plan. The user terminal 100 may display a result executed by the user terminal 100 as the first response on the display 140.

In operation 330, the processor 160 may receive a first user input. The first user input may be an input for displaying a user interface (UI) for changing a value of an option parameter associated with a voice input.

In the state where the first response to the voice input of the user is displayed on the display 140, the processor 160 may receive the first user input. For example, the first user input may be an input for swiping a screen in a specified direction (e.g., an upward and downward direction). For another example, the first user input may be a touch input for pushing a button displayed together with the first response.

In operation 340, the processor 160 may display a UI (hereinafter referred to as "parameter UI") for changing a value of an option parameter in response to the first user input. For example, the parameter UI may be a window overlapped with the first response. For another example, the UI may be a pop-up window displayed adjacent to a touch button on which the first user input occurs. Herein, it is not limited thereto, and various types of parameter UIs are possible.

In operation 350, the processor 160 may receive a second user input. The second user input may be an input for selecting a value of an option parameter.

When the second user input occurs, in operation 360, the processor 160 may display the second response based on the value of the option parameter, selected by the second user input.

According to an embodiment, the processor 160 may replace a part of the first response to generate the second response. For example, the processor 160 may change a search value to a period changed by the second user input and may display the found hotel, on a hotel search app installed in the user terminal 100.

According to another embodiment, the processor 160 may receive a new result based on the selected value of the option parameter from the intelligence server 200 and may display the second response, independently of the first response.

A speech recognition method performed in an electronic device according to various embodiments may include receiving a voice input of a user via a microphone of the electronic device, displaying a first response corresponding to the voice input on a display of the electronic device, receiving a first user input, displaying a user interface for changing at least one parameter associated with the voice input, in response to the first user input, receiving a second user input, and displaying a second response corresponding to the voice input on the display based on a value of the at least one parameter, selected by the second user input.

According to various embodiments, the speech recognition method may further include changing the value of the at least one parameter by an additional voice input after the voice input.

According to various embodiments, the displaying of the first response may include transmitting the value of the at least one parameter to an external server and receiving the first response. The displaying of the second response may include transmitting the selected value of the parameter to the external server and receiving the second response.

According to various embodiments, the displaying of the first response may include receiving the first response associated with executing an application which is not installed in the electronic device. The displaying of the second response may include receiving the second response associated with executing an application which is not installed in the electronic device.

According to various embodiments, the displaying of the user interface may include displaying the user interface including an image associated with the at least one parameter.

According to various embodiments, the displaying of the second response may include displaying a first object for changing a screen to the first response together with the second response. The speech recognition method may further include, after the screen is changed by a user input which occurs on the first object, displaying a second object for changing the screen to the second response together with the first response.

Figure 4:
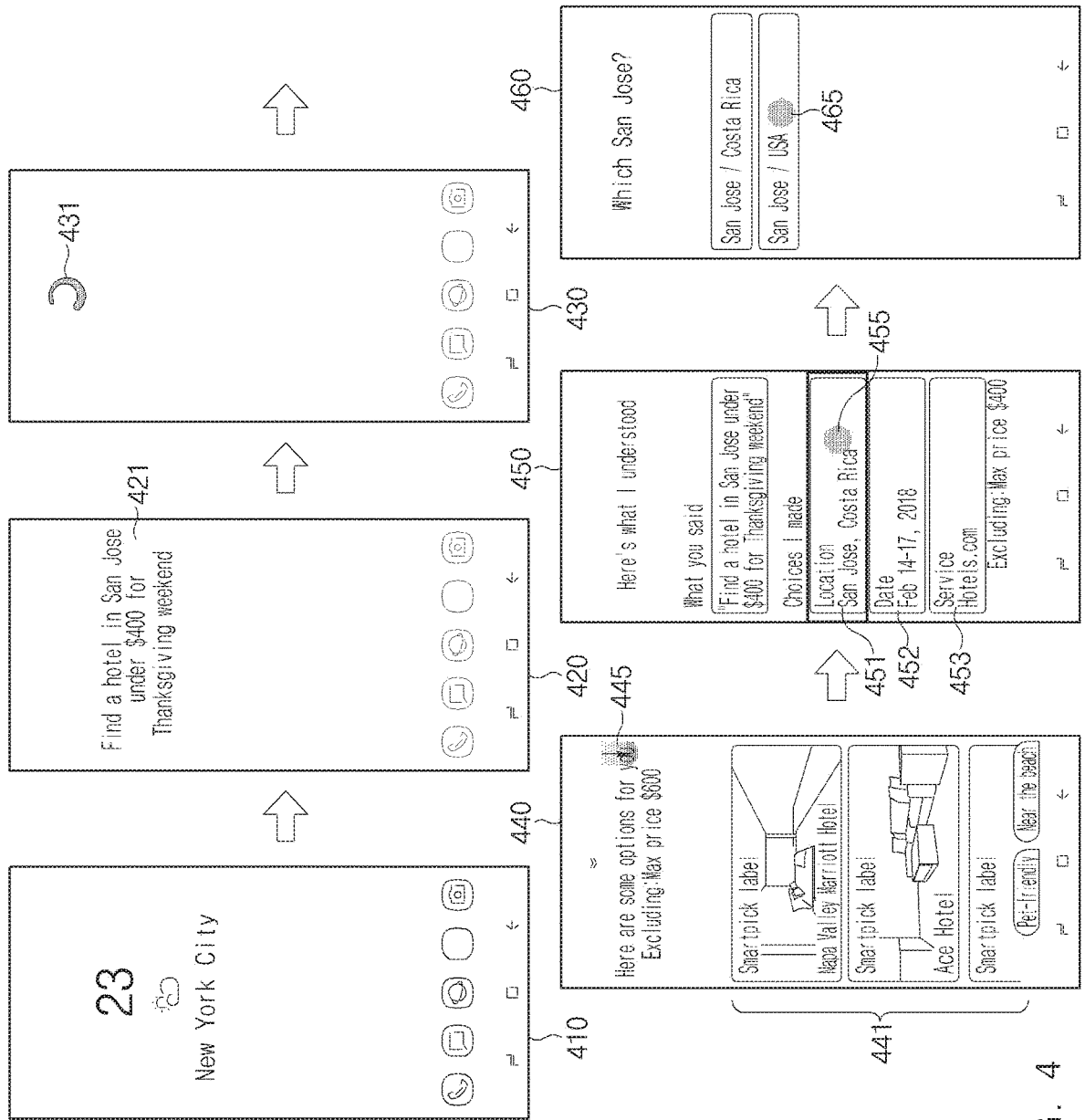
FIG. 4 is a drawing illustrating a screen for displaying a parameter user interface (UI) according to an embodiment of the disclosure.

FIG. 4 is a drawing illustrating a screen for displaying a parameter UI according to an embodiment of the disclosure. FIG. 4 is merely illustrative, and it is not limited thereto.

Referring to FIG. 4, a processor 160 of FIG. 2 may execute an intelligence app. The intelligence app may receive a voice input of a user and may display a response corresponding to the received voice input. The intelligence app may be executed by an input of the user or may be executed by calling of another application.

For example, the processor 160 may execute the intelligence app in response to a voice input (a wake-up word) (e.g., Hi Bixby) (start utterance) for starting a voice command of the user. For another example, the processor 160 may execute the intelligence app by a user input which occurs on a dedicated button which executes the intelligence app.

On screen 410, when the intelligence app is executed, the processor 160 may enter an idle state capable of receiving a voice input of the user. The processor 160 may display a state for waiting for receiving a voice input of the user using a text or voice.

On screen 420, the processor 160 may receive a voice input of the user. The processor 160 may convert the received voice input into a text 421 and may display the text 421 on a display 140 of FIG. 2. While identifying the displayed text 421, the user may determine whether the recognized voice input matches with an intent of the user. According to various embodiments, the processor 160 may transmit the received voice input or the text 421 into which the voice input is converted to an intelligence server 200 of FIG. 2.

On screen 430, the processor 160 may display an idle screen while processing the voice input of the user. The processor 160 may display an animation image 431 indicating that the voice input is being processed.

On screen 440, the processor 160 may display a first response 441 corresponding to the voice input of the user. According to an embodiment, the processor 160 may receive a result according to a plan generated by the intelligence server 200 and may display the first response 441 on the display 140 based on the received result. For example, when there is the voice input "find a hotel in San Jose under $400 for Thanksgiving weekend", the processor 160 may receive a result (a hotel list) found by a hotel search app from the intelligence server 200 and may display the received result as the first response 441.

According to another embodiment, the processor 160 may receive a plan generated by the intelligence server 200 and may execute an operation according to the received plane in a user terminal 100 of FIG. 2. The processor 160 may display the executed result as the first response 441 on the display 140. For example, when there is the voice input "find a hotel in San Jose under $400 for Thanksgiving weekend", the processor 160 may receive a plane including execution app information (Hotels.com), period information (2018/11/18), location information (San Jose in US), amount information ($0-$400), and the like from the intelligence server 200. In the user terminal 100 itself, the processor 160 may execute the 'Hotels.com' application depending on the received plan and may enter the period information (2018/11/18), the location information (San Jose in US), the amount information ($0-$400), and the like as search options, thus displaying the found result as the first response 441 on the display 140.

According to various embodiments, when there is an option parameter associated with the voice input, the processor 160 or the intelligence server 200 may determine one value depending on a specified rule and may display the first response 441. For example, when there is the voice input "find a hotel in San Jose under $400 for Thanksgiving weekend", the location parameter ('San Jose') may be found as a first area in US and a second area in Costa Ricans. In this case, the processor 160 or the intelligence server 200 may determine one area based on a location of the user terminal 100, a distance between the user terminal 100 and the first area or the second area, history information about a movement path of the user terminal 100, or the like and may display the result of searching for a hotel in the determined area as the first response 441.

According to various embodiments, in the state where the first response 441 is displayed, the processor 160 may receive a first user input 445 for changing a value of an option parameter. For example, the first user input 445 may be a swipe input in an upward and downward direction.

On screen 450, the processor 160 may display a parameter UI for selecting a value of an option parameter in response to the first user input 445. For example, the parameter UI may be a window overlapped and displayed with the first response 441.

The parameter UI may include a list about at least one option parameter. The list may include, for example, a location parameter 451, a date parameter 452, and an app type parameter 453.

The processor 160 may determine whether a second user input 455 for selecting one option parameter in the list occurs.

On screen 460, the processor 160 may display changeable values of an option parameter selected by the second user input 455 which occurs on the parameter UI.

For example, when the location parameter 451 is selected by the second user input 455, the processor 160 may display changeable values as the location parameter 451. For example, in the voice input "find a hotel in San Jose under $400 for Thanksgiving weekend", the location parameter 451 may include a first area in US and a second area in Costa Ricans.

When a third user input 465 for changing the location parameter 451 occurs, the processor 160 may display a second response based on a value selected by the third user input 465. For example, in a state where a first response for searching for a hotel around the first area is displayed, the processor 160 may display a second response for searching for a hotel around the second area selected by the third user input 465.

Figure 5:
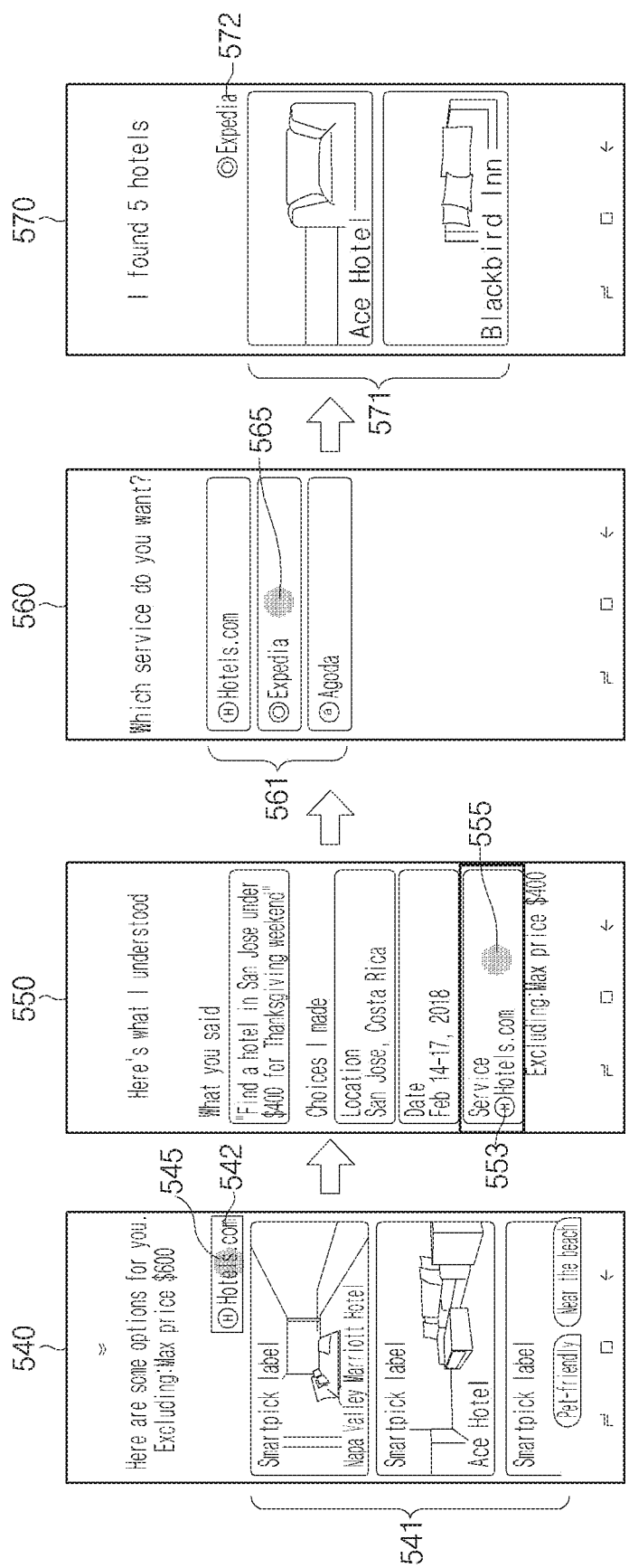
FIG. 5 is a drawing illustrating a screen indicating a button-type object for changing a value of an option parameter according to an embodiment of the disclosure.

FIG. 5 is a drawing illustrating a screen indicating a button-type object for changing a value of an option parameter according to an embodiment of the disclosure. FIG. 5 is merely illustrative, and it is not limited thereto.

Referring to FIG. 5, on screen 540, a processor 160 of FIG. 2 may display a first response 541 corresponding to a voice input of a user. The processor 160 may receive a result according to a plan generated by an intelligence server 200 of FIG. 2 and may display the first response 541 on a display 140 of FIG. 2 based on the received result. Alternatively, the processor 160 may receive a plan generated by the intelligence server 200 and may execute an operation according to the received plan in the user terminal 100. The processor 160 may display the executed result as the first response 541 on the display 140.

According to various embodiments, the processor 160 may display a button-type object for changing a value of an option parameter together with the first response 541. According to an embodiment, the button-type object 542 may be displayed as an icon or text associated with one of option parameters. For example, the button-type object 542 may be displayed as an icon and name of an application executed while displaying the first response 541. The processor 160 may receive a first user input 545 on the button-type object 542.

On screen 550, the processor 160 may display a parameter UI corresponding to the first user input 545. For example, the parameter UI may be a window overlapped and displayed with the first response 541. The parameter UI may include a list about at least one option parameter. The list may include, for example, an app type parameter 553. The processor 160 may determine whether a second user input 555 for selecting one option parameter in the list occurs.

On screen 560, the processor 160 may display an option list 561 including changeable values of an option parameter selected by the second user input 555 on the parameter UI.

For example, when the app type parameter 553 is selected by the second user input 555, the processor 160 may display changeable values of the app type parameter 553.

According to various embodiments, on screen 540, when the first user input 545 occurs, the processor 160 may fail to display screen 550 and may display the option list 561 on screen 560.

On screen 570, the processor 160 may display a second response 571 executed by a second application (e.g., Expedia) selected by a third user input 565.

According to an embodiment, the processor 160 may transmit information selected by the third user input 565 to the intelligence server 200 and may receive a result according to a plan generated by the intelligence server 200, thus displaying the second response 571 on the display 140 based on the received result. For example, the intelligence server 200 may request a service server 300 associated with the 'Expedia' selected by the third user input 565 to search for a hotel and may receive a result. The intelligence server 200 may transmit the received result to the user terminal 100. The processor 160 of the user terminal 100 may display the received result of searching for the hotel as the second response 571.

According to another embodiment, the processor 160 may reflect information selected by the third user input 565 in a plan received from the intelligence server 200. The processor 160 may execute an operation according to the plan in the user terminal 100 and may display the executed result as the second response 571 on the display 140. For example, the processor 160 may execute the 'Expedia' application selected by the third user input 565 and may enter a search option defined in the plan to search for a hotel. The processor 160 may display a hotel search result found by the 'Expedia' application as the second response 571.

According to various embodiments, the processor 160 may display a button-type object 572 for changing a parameter together with the second response 571. An icon of the button-type object 572 may be changed by reflecting information selected by the third user input 565.

Figure 6:
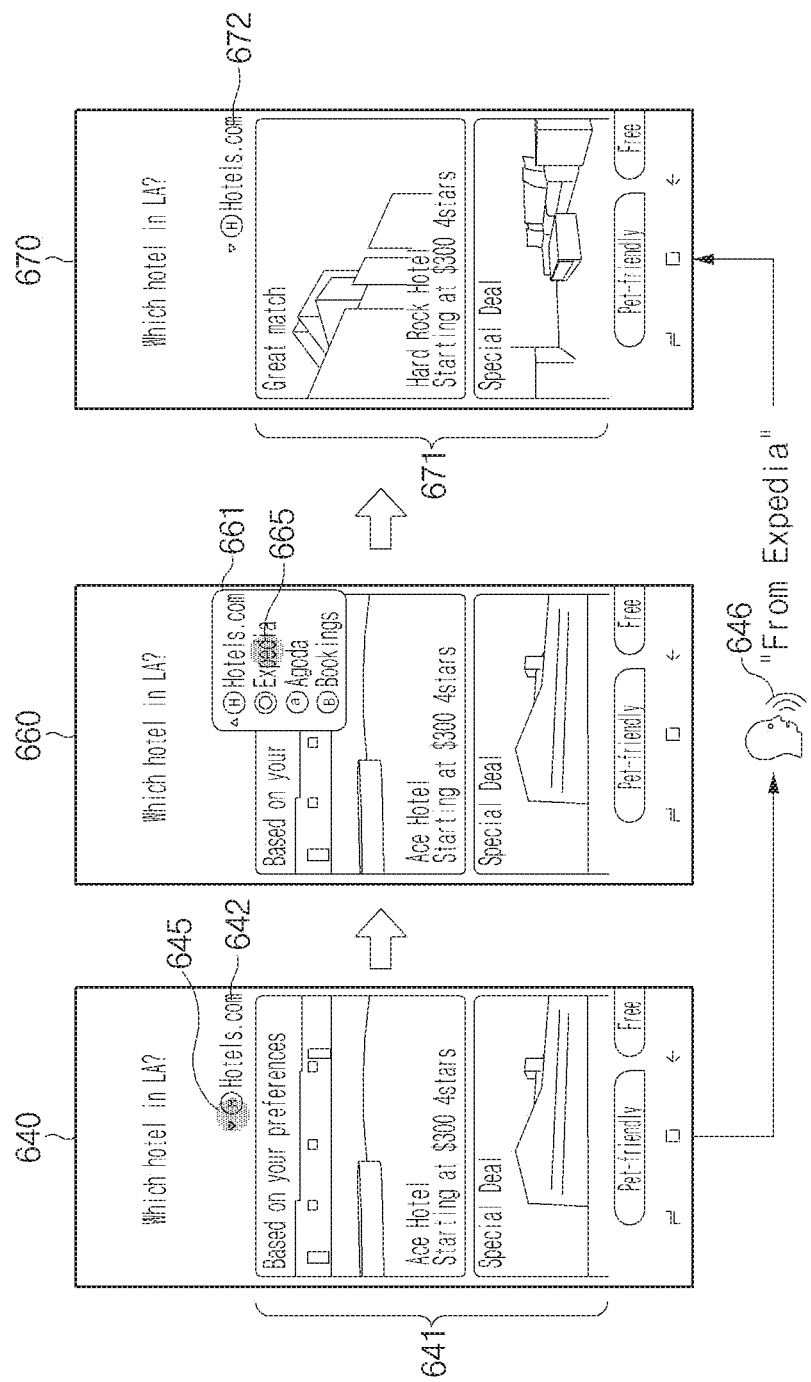
FIG. 6 is a drawing illustrating a screen indicating a selection-type object and a pop-up window for changing a value of an option parameter according to an embodiment of the disclosure.

FIG. 6 is a drawing illustrating a screen indicating a selection-type object and a pop-up window for changing a value of an option parameter according to an embodiment of the disclosure. FIG. 6 is merely illustrative, and it is not limited thereto.

Referring to FIG. 6, on screen 640, a processor 160 of FIG. 2 may display a first response 641 corresponding to a voice input of a user.

The processor 160 may receive a result according to a plan generated by an intelligence server 200 of FIG. 2 and may display the first response 641 on a display 140 of FIG. 2 based on the received result. Alternatively, the processor 160 may receive a plan generated by the intelligence server 200 and may execute an operation according to the received plane in a user terminal 100 of FIG. 2. The processor 160 may display the executed result as the first response 641 on the display 140.

According to various embodiments, the processor 160 may display a button-type object 642 for a parameter change together with the first response 641. According to an embodiment, the button-type object 642 may be displayed as an icon or text associated with one of optional parameters. For example, the button-type object 642 may be displayed as an icon or name of an application executed while displaying the first response 641. The processor 160 may receive a first user input 645 on the button-type object 642.

In FIG. 6, an embodiment is exemplified as the one button-type object 642 is displayed. However, embodiments are not limited thereto. For example, button-type objects may be displayed by the number of option parameters, or two or three of a plurality of option parameters may be selected and icons associated with the selected option parameters may be displayed.

On screen 660, the processor 160 may include a pop-up window 661 including changeable values of an option parameter associated with the button-type object 642.

For example, in the state where the button-type object 642 associated with a type of an executed app is displayed, when the first user input 645 occurs, the processor 160 may display the pop-up window 661, including changeable values of an app type parameter, adjacent to the button-type object 642.

In screen 670, when receiving a second user input 665 for selecting a second application (e.g., Expedia), the processor 160 may display a second response 671 executed by the second application (e.g., Expedia).

According to various embodiments, the processor 160 may transmit information selected by the second user input 665 to the intelligence server 200 and may receive a result according to a plan generated by the intelligence server 200, thus displaying the second response 671 on the display 140 based on the received result.

According to another embodiment, the processor 160 may reflect the information selected by the second user input 665 in the plan received from the intelligence server 200. The processor 160 may execute an operation according to the plane in the user terminal 100 and may display the executed result as the second response 671 on the display 140.

According to various embodiments, the processor 160 may display a button-type object 672 for a parameter change together with the second response 671. An icon of the button-type object 672 may be changed by reflecting the information selected by the second user input 665.

According to various embodiments, when a separate voice input 646 for an option change occurs, the processor 160 may change an option parameter based on the voice input 646 and may display the second response 671. In this case, the separate pop-up window 661 may fail to be displayed (there may be a change from screen 640 to screen 670).

Figure 7:
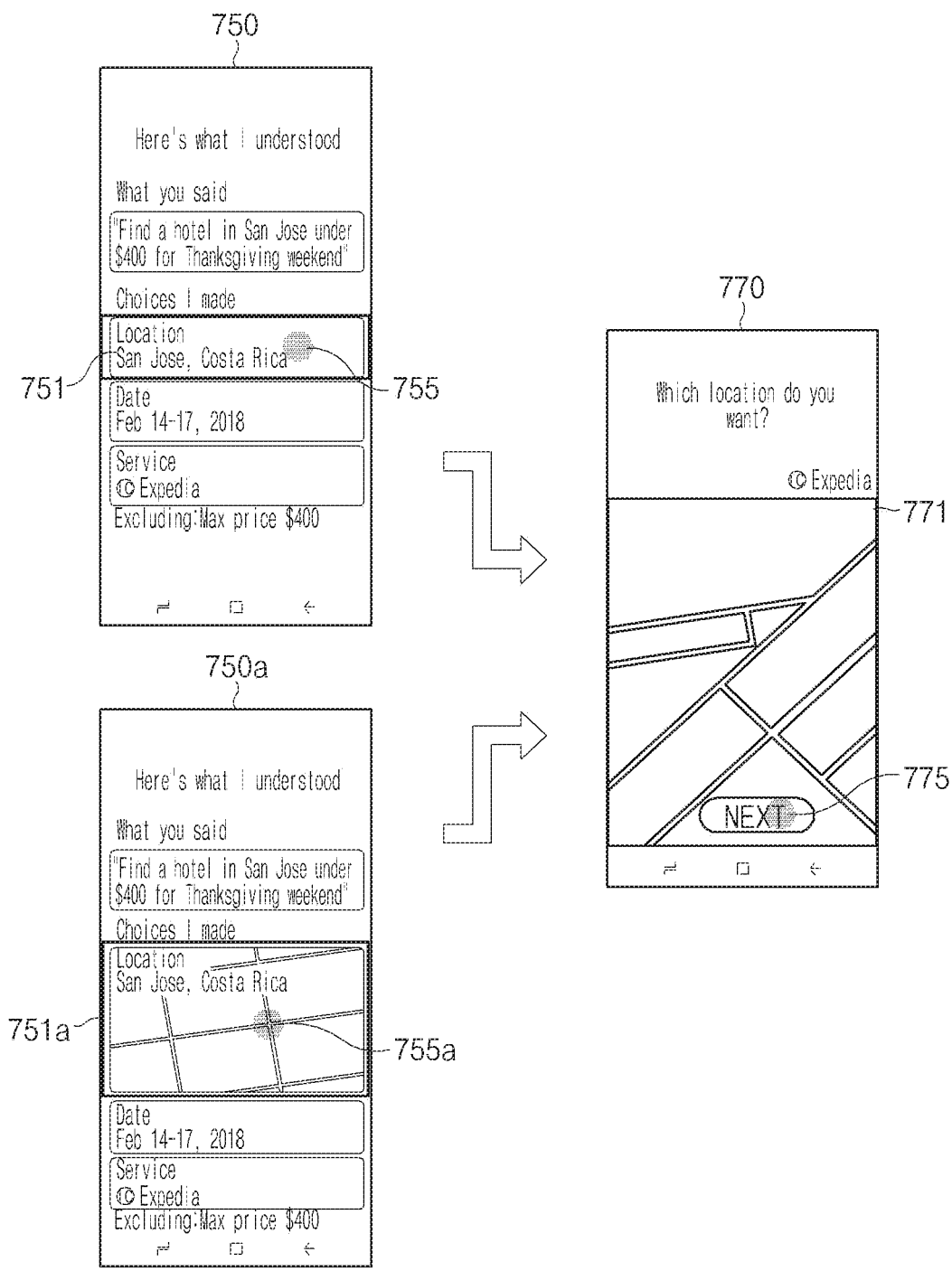
FIG. 7 is a drawing illustrating a screen indicative of providing additional information associated with an option parameter according to an embodiment of the disclosure.

FIG. 7 is a drawing illustrating a screen indicative of providing additional information associated with an option parameter according to an embodiment of the disclosure. FIG. 7 is merely illustrative, and it is not limited thereto.

Referring to FIG. 7, on screen 750, a processor 160 of FIG. 2 may display a parameter UI capable of changing a value of an option parameter. The parameter UI may include a list about at least one option parameter. The processor 160 may determine whether a user input 755 for selecting one option parameter in the list occurs. The list may include, for example, a location parameter 751.

According to an embodiment, on screen 750a, the processor 160 may display a list about an option parameter using an image. For example, the processor 160 may display a location parameter 751a using a map image. The processor 160 may determine whether a user input 755a for selecting one option parameter in the list occurs.

On screen 770, the processor 160 may display additional information 771 in response to the user input 755 or the user input 755a. For example, when the location parameter 751 (or the location parameter 751a) is selected by the user input 755 (or the user input 755a), the processor 160 may display a movable map image as the additional information 771.

When a location is changed by movement and selection of the map image and when an input 775 for determining a location of the user occurs, the processor 160 may display a second response executed by the determined location.

Figure 8:
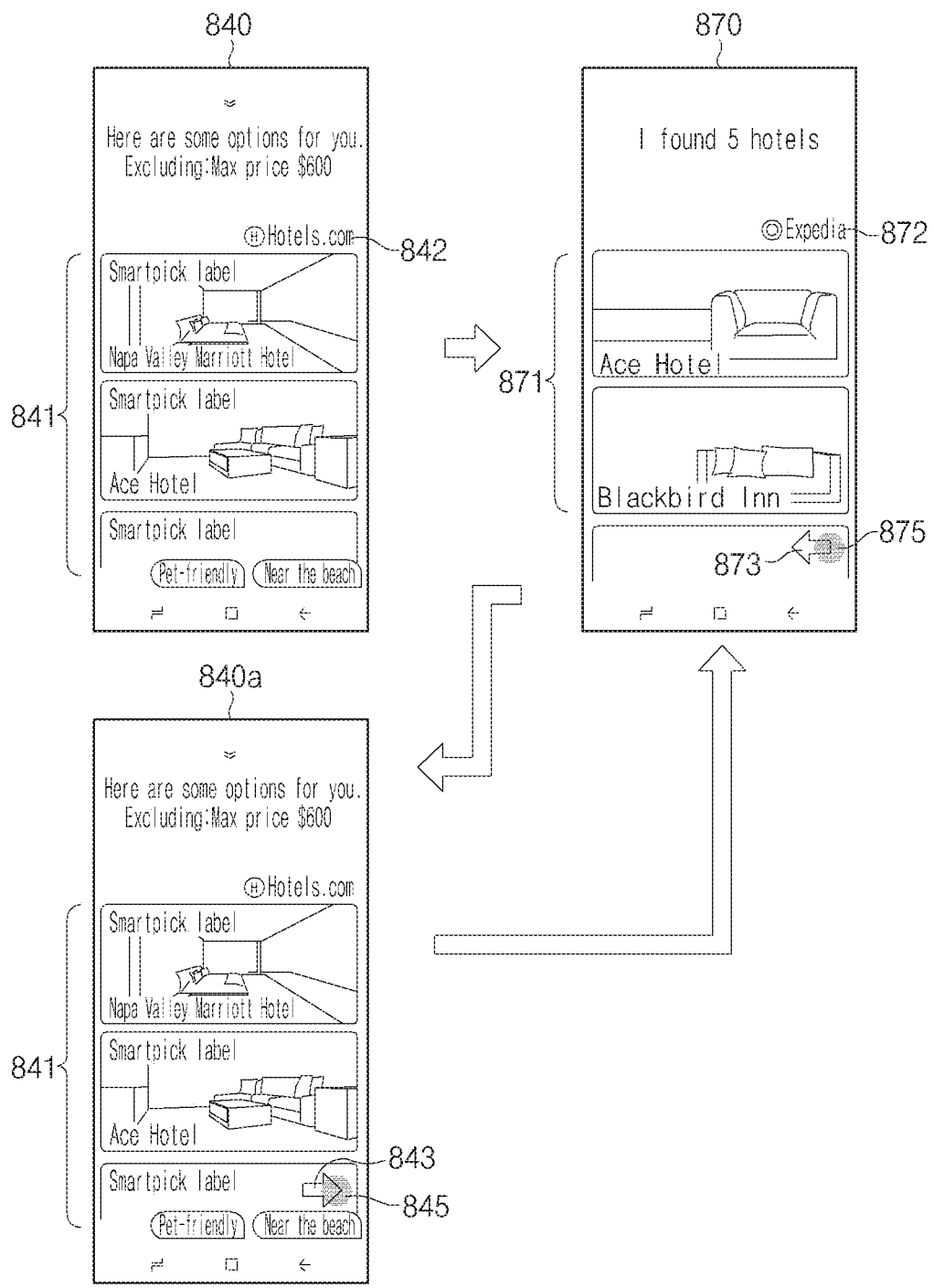
FIG. 8 is a drawing illustrating a screen indicating conversion between a first response and a second response according to an embodiment of the disclosure.

FIG. 8 is a drawing illustrating a screen indicating conversion between a first response and a second response according to an embodiment of the disclosure.

Referring to FIG. 8, on screen 840, a processor 160 of FIG. 2 may display a first response 841 corresponding to a voice input of a user. The processor 160 may display a button-type object 842 for a parameter change together with the first response 841. According to an embodiment, the button-type object 842 may be displayed as an icon or text associated with one of option parameters. For example, the button-type object 842 may be displayed as an icon and name of an application executed while displaying the first response 841.

When a user input occurs on the button-type object 842, the processor 160 may display a list of changeable option parameters. When an additional user input occurs on the list, the processor 160 may change a value of an option parameter.

Screen 870, the processor 160 may display a second response 871 in response to the value of the option parameter, selected by the user input. The processor 160 may display a button-type object 872 for a parameter change together with the second response 871. An icon of the button-type object 872 may be changed by reflecting information selected by a user input.

According to various embodiments, the processor 160 may display a back button 873 for returning to a result before an option parameter is changed. The processor 160 may receive a user input 875 on the first screen shift button (e.g., the back button) 873.

On screen 840a, when the user input 875 occurs on the back button 873, the processor 160 may display the first response 841 again. The processor 160 may display a second screen shift button (e.g., a forward button) 843 for returning to a response result after an option parameter is changed.

When receiving a user input 845 on the second screen shift button 843, the processor 160 may display the second response 871 again.

According to various embodiments, when the user consecutively changes an option parameter, the first screen shift button 873 and the second screen shift button 843 may be displayed at the same time.

Figure 9:
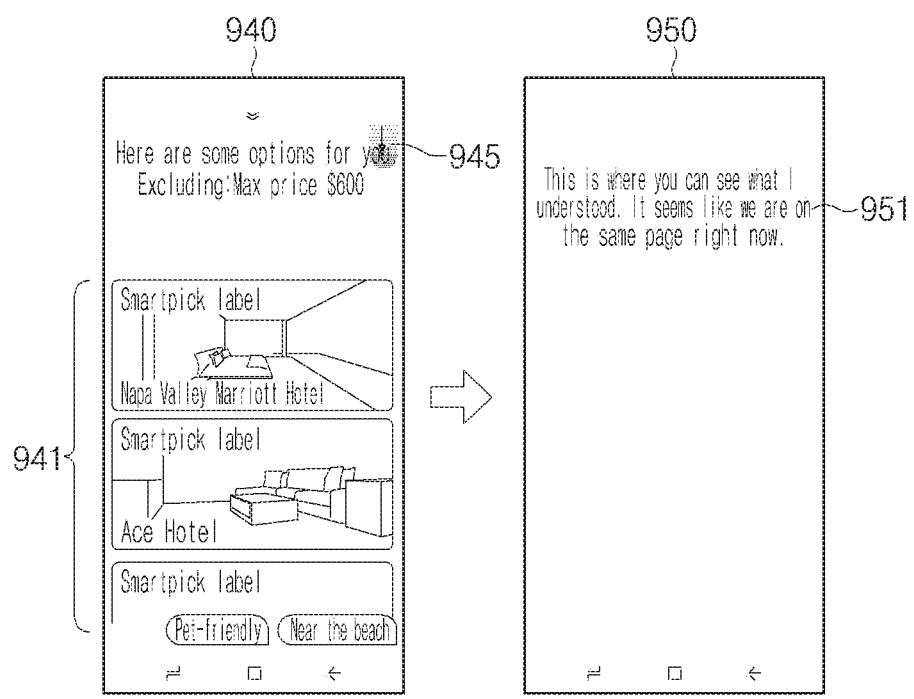
FIG. 9 is a drawing illustrating a screen when there is no selectable parameter according to an embodiment of the disclosure.

FIG. 9 is a drawing illustrating a screen when there is no selectable parameter according to an embodiment of the disclosure.

Referring to FIG. 9, screen 940, a processor 160 of FIG. 2 may display a first response 941 corresponding to a voice input of a user. In the state where the first response 941 is displayed, the processor 160 may receive a first user input 945 for changing a value of an option parameter. For example, the first user input 945 may be a swipe input of an upward and downward direction.

On screen 950, when there is no changeable option parameter, the processor 160 may display an information message 951.

According to an embodiment, when there is no changeable option parameter, the processor 160 may display that there is no changeable option parameter, using a pop-up message without separate screen shift.

The electronic device according to various embodiments disclosed in the disclosure may display a first response corresponding to a one-time voice input and may then display a second response, an execution option of which is changed by a simple user input.

The electronic device according to various embodiments disclosed in the disclosure may provide a user interface capable of changing a parameter of a voice input in various manners. In addition, various effects directly or indirectly ascertained through the disclosure may be provided.

Figure 10:
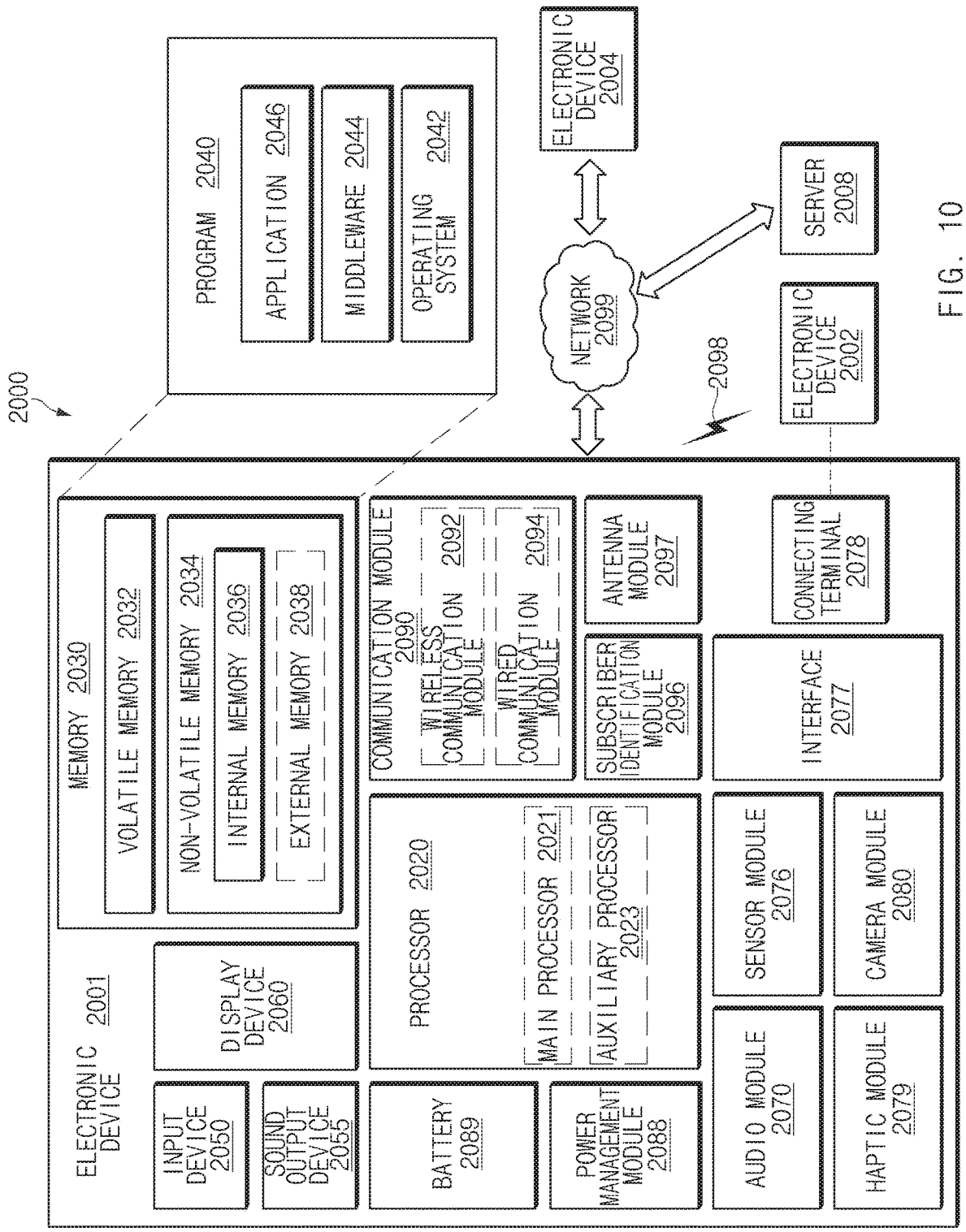
FIG. 10 is a block diagram illustrating an electronic device in a network environment according to an embodiment of the disclosure.

FIG. 10 is a block diagram of an electronic device 2001 in a network environment 2000, according to an embodiment of the disclosure. An electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the disclosure, the wearable devices may include accessories (for example, watches, rings, bracelets, ankle bracelets, glasses, contact lenses, or HMDs), cloth-integrated types (for example, electronic clothes), body-attached types (for example, skin pads or tattoos), or implantable types (for example, implantable circuits). In some embodiments of the disclosure, the electronic device may be one of home appliances. The home appliances may include, for example, at least one of a digital video disk (DVD) player, an audio, a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic panel.

In another embodiment of the disclosure, the electronic device may include at least one of various a navigation system, a global navigation satellite system (GNSS), an event data recorder (EDR) (e.g., vehicle/ship/airplane black box), an automotive infotainment device (e.g., a head-up display for a vehicle), an industrial or household robot, a drone, an automated teller machine (ATM), a point of sale (POS) Or at least one of an object Internet device (e.g., a light bulb, a sprinkler device, a fire alarm, a thermostat, or a streetlight). The electronic device according to the embodiment of the document is not limited to the above-described devices and may also be provided with a plurality of electronic devices such as a smart phone having a function of measuring biometric information (e.g., heartbeat or blood sugar) It is possible to combine the functions of the devices. In this document, the term user may refer to a person using an electronic device or a device using an electronic device (e.g., an artificial intelligence electronic device).

Referring to FIG. 10, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008.

According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023.

The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034. Nonvolatile memory 2034 may include internal memory and/or external memory (e.g., internal memory 2036 and external memory 2038).

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connecting terminal 2078 may include a connector that may allow the electronic device 2001 to be physically connected with an external electronic device (e.g., the electronic device 2002). According to an embodiment, the connecting terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a GNSS communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or a wide area network (WAN))). The above-described kinds of communication modules may be integrated in one component (e.g., a single chip) or may be implemented with a plurality of components (e.g., a plurality of chips) which are independent of each other. The wireless communication module 2092 may verify and authenticate the electronic device 2001 within a communication network, such as the first network 2098 or the second network 2099, by using subscriber information (e.g., international mobile subscriber identity (IMSI)) stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

According to various embodiments, an electronic device includes a display, a microphone, a memory, a communication circuitry, and a processor, wherein the processor is configured to receive a voice input of a user via the microphone, display a first response corresponding to the voice input on the display, receive a first user input, display a user interface for changing at least one parameter associated with the voice input, in response to the first user input, receive a second user input via the user interface, and display a second response corresponding to the voice input on the display based on a value of the at least one parameter, the value being selected by the second user input.

According to various embodiments, the user interface includes a list of the at least one parameter or a list of values to which the at least one parameter is changeable.

According to various embodiments, the user interface is a pop-up window including a list of values to which the at least one parameter is changeable.

According to various embodiments, the processor is configured to change the value of the at least one parameter by an additional voice input after the voice input.

According to various embodiments, the processor is configured to transmit the value of the at least one parameter to an external server via the communication circuitry, and receive the first response or the second response.

According to various embodiments, the processor is configured to receive the first response or the second response associated with executing an application which is not installed in the electronic device.

According to various embodiments, the processor is configured to display the user interface including an image associated with the at least one parameter.

According to various embodiments, the processor is configured to display a first object for changing a screen to the first response together with the second response.

According to various embodiments, the processor is configured to after the screen is changed by a user input which occurs on the first object, display a second object for changing the screen to the second response together with the first response.

According to various embodiments, the first user input is a swipe input in a specified direction.

According to various embodiments, the first user input is a touch input on a button-type object displayed together with the first response.

According to various embodiments, the processor is configured to display the button-type object as an icon or text associated with the at least one parameter.

It should be understood that the various embodiments of the document and the terminology used are not intended to limit the techniques described in this document to any particular embodiment, but rather to include various modifications, equivalents, and/or alternatives of the embodiments. In connection with the description of the drawings, like reference numerals may be used for similar components. The singular expressions may include plural expressions unless the context clearly dictates otherwise. In this document, the expressions "A or B," "at least one of A and/or B," "A, B or C," or "at least one of A, B, and/Possible combinations. Expressions such as "first", "second" is not limited to those components. When it is mentioned that some (e.g., first) component is "(functionally or communicatively) connected" or "connected" to another (second) component, May be connected directly to the component, or may be connected through another component (e.g., a third component).

In this document, the term "adapted to or configured to" as used herein is intended to encompass all types of information, including, but not limited to, "made to do", "designed to", or "designed to" In some situations, the expression "a device configured to" may mean that the device can "do" with other devices or components. For example, a processor configured (or configured) to perform the phrases "A, B, and C" may be a processor dedicated to performing the operations (e.g., an embedded processor) By executing the above programs, it can mean a general-purpose processor (e.g., CPU or application processor (AP)) that can perform the corresponding operations.

As used herein, the term "module" includes a unit of hardware, software or firmware and may be used interchangeably with terms such as, for example, logic, logic blocks, components. A "module" may be an integrally constructed component or a minimum unit or part thereof that performs one or more functions. "Module" may be implemented either mechanically or electronically, for example, by application-specific integrated circuit (ASIC) chips, field-programmable gate arrays (FPGAs) and programmable logic devices.

At least some of the devices (e.g., modules or their functions) or methods (e.g., operations) according to various embodiments may be stored in a computer readable storage medium (e.g., memory 2030). When the instruction is executed by a processor (e.g., processor 2020), the processor may perform a function corresponding to the instruction. The computer-readable recording medium may be a hard disk, a floppy disk, a magnetic medium such as a magnetic tape, an optical recording medium such as a compact disk read only memory (CD-ROM), a DVD, a magnetic-optical medium such as a floppy disk, the instructions may include code generated by the compiler or code that may be executed by the interpreter.

Each of the components (e.g., modules or program modules) according to various embodiments may be comprised of a single entity or a plurality of entities, and some subcomponents of the previously mentioned subcomponents may be omitted. Alternatively or additionally, some components (e.g., modules or program modules) may be integrated into one entity to perform the same or similar functions performed by each respective component prior to integration. Operations performed by modules, program modules, or other components in accordance with various embodiments may be performed sequentially, in a parallel, repetitive, or heuristic manner, or at least some operations may be performed in a different order, or can be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
a microphone;
a memory;
a communication circuitry; and
at least one processor,
wherein the memory storing one or more computer programs configured to be executed by the at least one processor,
the one or more computer programs including instructions to:
receive a voice input of a user via the microphone,
determine whether the voice input comprises at least one option parameter having a plurality of possible values,
when the voice input comprises the at least one option parameter, determine a first value of the at least one option parameter from the plurality of possible values depending on a specified rule,
display, on the display, a first response corresponding to the first value of the at least one option parameter in the voice input and an object for changing a value of the at least one option parameter,
receive a first user input on the object,
display, on the display, a user interface for changing the first value of the at least one option parameter associated with the voice input, in response to the first user input,
receive a second user input via the user interface, and
display, on the display, a second response corresponding to the voice input based on a second value of the at least one option parameter, the second value being selected by the second user input.

2. The electronic device of claim 1, wherein the user interface includes a list of the at least one option parameter or a list of values to which the at least one option parameter is changeable.

3. The electronic device of claim 1, wherein the user interface comprises a pop-up window including a list of values to which the at least one option parameter is changeable.

4. The electronic device of claim 1, wherein the one or more computer programs further include instructions to change the second value of the at least one option parameter by an additional voice input after receiving the voice input.

5. The electronic device of claim 1, wherein the one or more computer programs further include instructions to:
transmit the first value of the at least one option parameter to an external server via the communication circuitry, and
receive the first response or the second response.

6. The electronic device of claim 5, wherein the one or more computer programs further include instructions to:
receive the first response or the second response associated with executing an application which is not installed on the electronic device.

7. The electronic device of claim 1, wherein the one or more computer programs further include instructions to:
display the user interface including an image associated with the at least one option parameter.

8. The electronic device of claim 1, wherein the one or more computer programs further include instructions to:
display a first object for changing a screen to the first response together with the second response.

9. The electronic device of claim 8, wherein the one or more computer programs further include instructions to:
after the screen is changed by a user input which occurs on the first object, display a second object for changing the screen to the second response together with the first response.

10. The electronic device of claim 1, wherein the first user input comprises a swipe input in a specified direction.

11. The electronic device of claim 1, wherein the one or more computer programs further include instructions to:
display the object as an icon or text associated with the at least one option parameter.

12. A speech recognition method performed in an electronic device, the method comprising:
receiving a voice input of a user via a microphone of the electronic device,
determining whether the voice input comprises at least one option parameter having a plurality of possible values;
when the voice input comprises the at least one option parameter, determining a first value of the at least one option parameter from the plurality of possible values depending on a specified rule;
displaying, on a display of the electronic device, a first response corresponding to the first value of the at least one option parameter in the voice input and an object for changing a value of the at least one option parameter;
receiving a first user input on the object;
displaying a user interface for changing the first value of the at least one option parameter associated with the voice input, in response to the first user input;
receiving a second user input via the user interface; and displaying, on the display, a second response corresponding to the voice input based on a second value of the at least one option parameter, the second value being selected by the second user input.

13. The method of claim 12, further comprising:
changing the second value of the at least one option parameter by an additional voice input after receiving the voice input.

14. The method of claim 12,
wherein the displaying of the first response includes:
transmitting the first value of the at least one option parameter to an external server; and
receiving the first response, and
wherein the displaying of the second response includes:
transmitting the selected second value of the option parameter to the external server; and
receiving the second response.

15. The method of claim 12,
wherein the displaying of the first response includes receiving the first response associated with executing an application which is not installed on the electronic device, and
wherein the displaying of the second response includes receiving the second response associated with executing an application which is not installed on the electronic device.

16. The method of claim 12, wherein the displaying of the user interface includes displaying the user interface including an image associated with the at least one option parameter.

17. The method of claim 12, wherein the displaying of the second response includes displaying a first object for changing a screen to the first response together with the second response.

18. The method of claim 17, further comprising:
after the screen is changed by a user input which occurs on the first object, displaying a second object for changing the screen to the second response together with the first response.

19. The method of claim 12, wherein the user interface includes a list of the at least one option parameter or a list of values to which the at least one option parameter is changeable.

20. The electronic device of claim 1, wherein the at least one option parameter includes location attributes, date attributes, time attributes, and application type attributes required to perform a service corresponding to the voice input.

* * * * *